March 16, 1948.    J. M. SUMMERS    2,438,077
LOCK NUT
Filed June 23, 1943    2 Sheets-Sheet 1
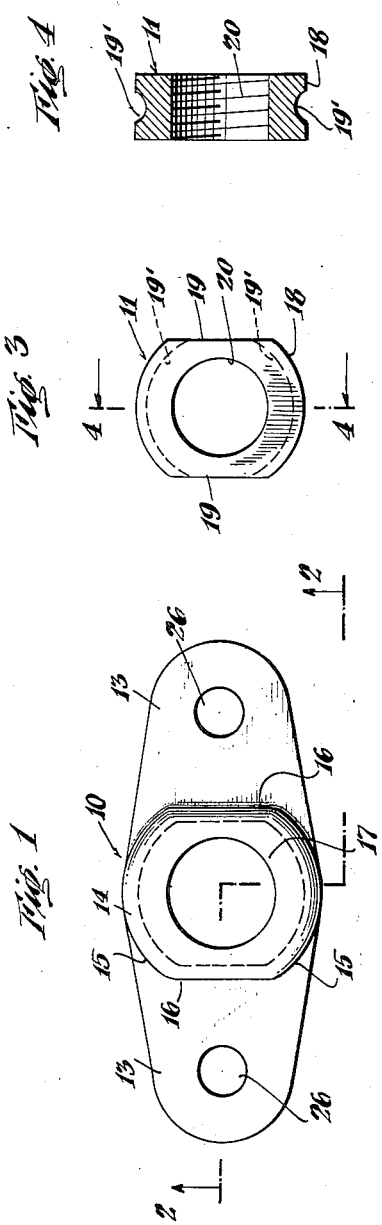
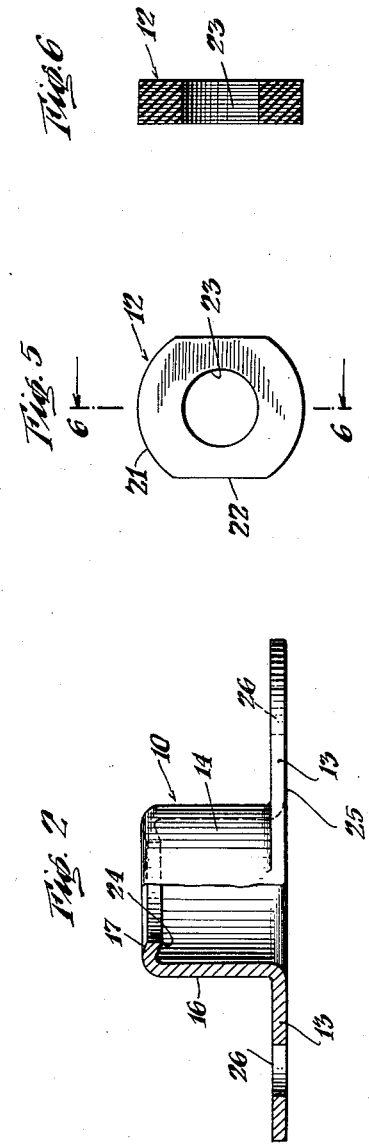
INVENTOR.
J Mills Summers
BY
ATTORNEYS March 16, 1948. J. M. SUMMERS 2,438,077
LOCK NUT
Filed June 23, 1943 2 Sheets-Sheet 2
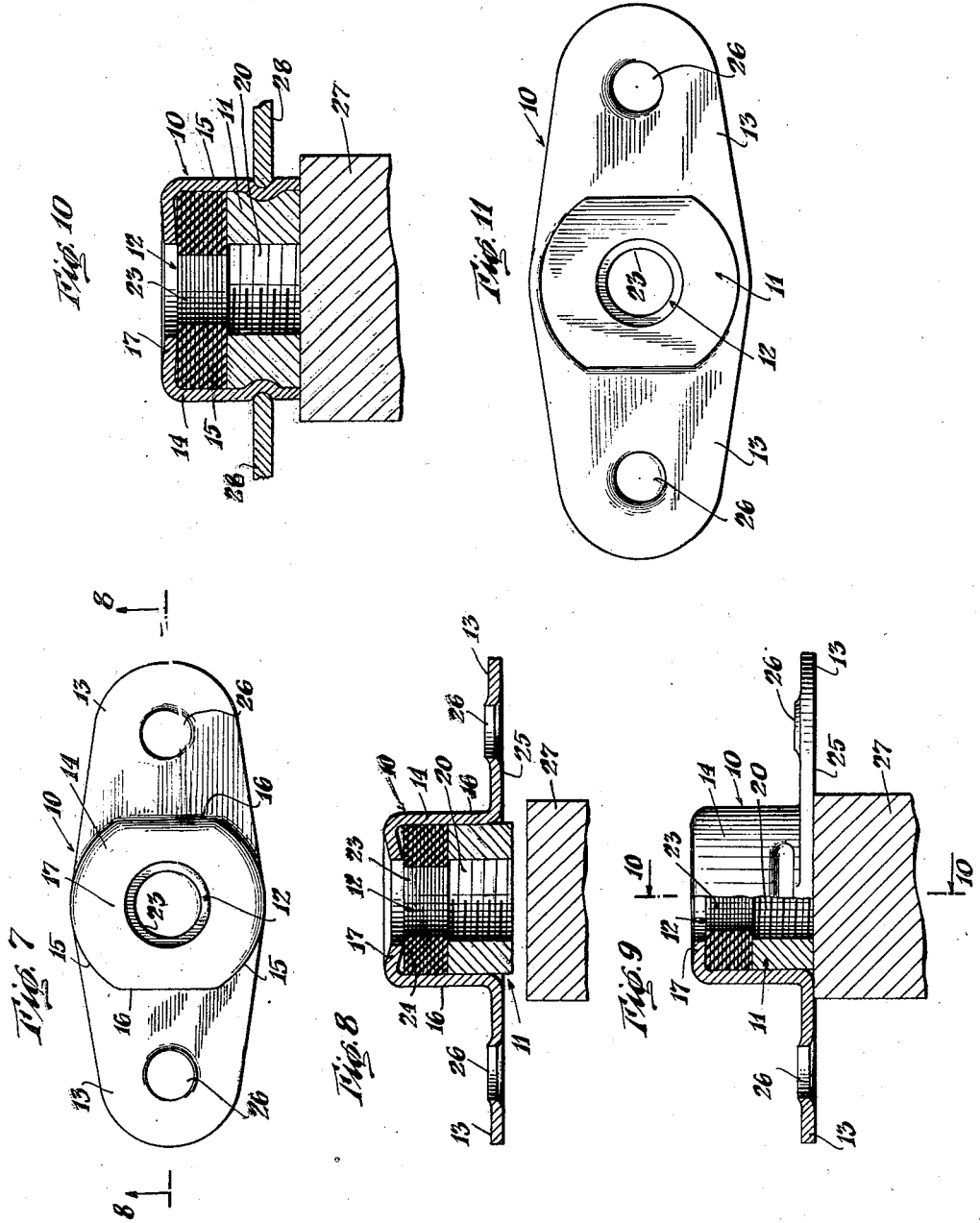
INVENTOR.
J Mills Summers
BY
ATTORNEYS Patented Mar. 16, 1948

2,438,077

UNITED STATES PATENT OFFICE 2,438,077

LOCK NUT

J Mills Summers, Englewood, N. J., assignor to Camloc Fastener Corporation, New York, N. Y., a corporation of New York Application June 23, 1943, Serial No. 491,895

1 Claim. (Cl. 151—7)

This invention relates to a new nut of the type generally referred to as anchor or self-locking nuts.

As is well recognized, these nuts find widespread application in connection with use on structures or machines subject to substantial vibrations. One specific field, namely use on aircraft, requires nuts of this type of exceedingly light weight construction having high characteristics of durability, strength and resistance to vibration.

Heretofore in this art various types of nuts have been manufactured and used but all have presented difficulties of manufacture or installation, which it has been recognized would be desirable to overcome. In addition, many of the nuts have had undesirable characteristics of excess weight and size. Some of these recognized difficulties have been inherent in these structures and were not susceptible of complete elimination irrespective of cost. The present structure and method overcome the numerous faults present in prior products and additionally in overcoming these faults do so in such a manner that cost is maintained low and speed of manufacture high.

The structure and method of assembling will be clearly understood by reference to the accompanying specification and attached drawings, in which:

Fig. 1 is a top plan view of one form of outer shell forming part of the nut;

Fig. 2 is a cross sectional view taken along the line 2—2 of Fig. 1;

Fig. 3 is a top plan view of the thread-bearing portion of my nut assembly;

Fig. 4 is a cross section taken along the line 4—4 of Fig. 3;

Fig. 5 is a top plan view of the locking washer used in connection with the nut assembly;

Fig. 6 is a cross section taken along line 6—6 in Fig. 5;

Fig. 7 is a top plan view of the nut assembly after the locking washer and nut have been inserted during assembly;

Fig. 8 is a cross section taken along the line 8—8 of Fig. 7 and showing the nut during assembly;

Fig. 9 is an elevational view with parts broken away to show the fiber and thread-bearing portion of the nut compressed into position and staked;

Fig. 10 is a cross sectional view of the nut after assembly taken along the line 10—10 in Fig. 9 and showing the staking operation.

Fig. 11 is a bottom plan view of the nut in assembled condition.

Preferably the nut is composed of three parts generally referred to as the outer shell or housing 10, the thread-bearing nut 11 and the locking washer 12. In describing the present invention I am doing so in connection with drawings illustrating a type of nut used for riveted application. The specific one shown has two ears. In some aspects my invention is equally applicable to riveted type nuts of various configurations as, for example, a nut with one ear as well as to nuts of a normal type not adapted for riveted assembly.

In the nut shown the outer shell 10 is preformed by stamping from thin sheet metal such that there is provided a structure having outwardly extending ears 13 from which extend upwardly a generally cup-shaped housing 14 having curved or arcuate walls 15 extending upwardly from adjacent the outer edges of the ears and substantially flattened side walls 16 disposed at an angle with said arcuate walls and facing towards the ears. The flattened side walls and the position of these walls as shown provide for many benefits hereinafter to be mentioned.

The upper portion of the housing is preformed with an inturned flange or tongue 17 provided with a central opening preferably circular in shape. Preferably this flange, in its preformed condition, extends angularly inwardly and downwardly into said housing, and while the amount of angular inward and downward extension may vary dependent upon the size of the nut and the material used in its fabrication, it is desirable that at all times this inward and downward extension be sufficient to act as a subsequent tensioning means for securing the parts in tight assembled position as will more fully be brought out.

Adapted to be placed within the shell or housing is a thread-bearing nut element 11, which may be formed of any suitable material such as steel and is generally shaped to conform to the shape of the outer shell, thus having rounded portions 18 and flat side walls or portions 19. Preformed substantially throughout the rounded walls 18, and midway between the bottom and top of the nut are grooves 19' sufficiently deep to permit of a compression of metal therein for holding the nut in the housing. This nut is, of course, provided with the usual central bore and threads 20.

Formed in a shape similar to that of the threaded nut is the locking washer 12 having the rounded side portions 21 and flat side walls 22 as well as the central bore or opening 23 which is preferably of a diameter less than the diameter of the tapped hole 20. This locking element may be formed from any suitable material, as is well known in the art, and in one preferred construction may take the form of a fibre washer which may be coated with wax or other similar substance.

The thickness of the threaded portion of the nut and the locking washer may vary dependent upon required characteristics of strength. However, as shown in Fig. 8, the overall thickness of the nut and washer in unassembled condition is preferably greater than the distance between the innermost portion or face 24 of the inturned flange 17 and the lowermost surface 25 of the shell 18.

In the type of structure having ears for riveting, the ears are generally provided with rivet holes 26 which, as is well understood in the art, are for the purpose of riveting the entire nut assembly in position. As shown in Fig. 8 and due to the desirable manner in which the present shell is formed, thus providing thin sheet metal ears, these holes may, if desired, be dimpled, thereby providing for a flush rivet head.

In assembling this structure the locking washer and threaded nut are inserted into the outer shell as shown in Fig. 8. In this position, the innermost face of the washer is resting against the face 24 of the inturned flange while the outermost face of the nut is extending beyond the face 25 of the shell. A plunger head or press 27 actuated by any suitable means (not shown) is then used to compress the nut and locking washer into the shell against the resilient inturned flange and to a point where the lowermost face of the nut is in the same plane as the lowermost face 25 of the shell.

As will be seen from Fig. 9, in this position the inwardly turned tongues have changed position somewhat so as to be more approximately horizontally disposed and are exerting a compressive pressure on the locking washer.

While held in this position as, for example, by the head 27 as shown in Fig. 10, and by some suitable means, for example, staking tools 28 actuated in any suitable manner, the portion of the shell of the curved faces 15 adjacent to the groove 19' are collapsed into that groove and thereby securely hold the nut against withdrawal. In this assembled position the inturned resilient tongues continue to exert desirable pressure against the locking washer and yet the entire assembly is free to be used without fear of failure due to the dropping or falling out of the nut asembly.

It will be readily recognized that this method of assembly is readily adaptable with nuts of various types with or without ear portions for riveted application. However, it should be pointed out that some of the features as applied to the riveted application are highly desirable. Due to the flat sided portion of the central shell extending towards the riveting ears, a greater riveting space is provided. In addition, due to the further spacing of the central portion of the housing from the rivet holes 26 and due to the desirable use of a sheet metal shell, the rivet holes may be satisfactorily dimpled for flush mounting or recessing of the rivet heads. The use of thin sheet metal permits a forming of the riveting ears of the lightest possible construction, at the same time permitting the other portions of the nut to be made from the least amount of material.

The preformed inturned flange exerting a continuous resilient pressure serves to keep the assembly in its proper position and acts to provide the necessary means of tight fit at all times irrespective of varying sizes and tolerances of the parts used in the assembly. This nut provides a structure suitable for use even though the clearance hole over which the nut may be mounted is larger than the diameter of the thread-bearing portion of the nut, inasmuch as the positive securing means for holding the thread-bearing portion of the nut in place prevent its being pulled through such larger clearance hole.

It will be readily recognized to those in the art that this new nut achieves these and many other benefits and that the structure may be utilized in various shaped nuts of generally similar design without in any manner departing from the spirit of the invention as defined in the accompanying claim.

I claim:

A nut comprising a unitary shell stamped from resilient, flat sheet metal and comprising a base portion having means for securement to a member, a housing portion extending upwardly from the base portion, at least two opposed side walls of the housing portion being substantially flat, the upper wall of the housing portion having an opening whose marginal edges are inclined inwardly and downwardly, a separate nut element and a separate locking element positioned within the housing in superimposed relation, each formed with apertures which are generally aligned with the opening in the upper wall, the side walls of the elements conforming generally to the contour of the side walls of the housing and engaging the same to prevent relative rotation between the elements and the shell, the over-all height of such elements being greater than the height of the housing from the base portion to the downwardly-turned edges in the upper wall, the lowermost element having recesses in the side walls thereof, the adjacent side walls of the housing being inwardly moved into such recesses for retaining said elements in the housing under compression against the downwardly-turned edges, the lower surfaces of the lowermost element and the base portion being on substantially the same plane, such normally, downwardly-turned edges being resiliently held upwardly against the upper surface of the uppermost element.

J MILLS SUMMERS.

REFERENCES CITED

The following references are of record in the file of this patent:

UNITED STATES PATENTS

| Number | Name | Date |
|---|---|---|
| 1,464,216 | Paden | Aug. 7, 1923 |
| 2,150,194 | Thomas | Mar. 14, 1939 |
| 2,204,385 | Schmidt et al. | June 11, 1940 |
| 2,234,557 | Hungerford | Mar. 11, 1941 |
| 2,331,322 | Heinick | Oct. 12, 1943 |
| 2,385,851 | Swanstrom | Oct. 2, 1945 |
| 2,389,989 | Luce | Nov. 27, 1945 |
| 2,391,989 | Luce | Jan. 1, 1946 |

FOREIGN PATENTS

| Number | Country | Date |
|---|---|---|
| 461,638 | Great Britain | Feb. 22, 1937 |